United States Patent
Sohn et al.

(10) Patent No.: US 7,050,130 B2
(45) Date of Patent: May 23, 2006

(54) COLOR FILTER SUBSTRATE FOR LIQUID CRYSTAL DISPLAY AND MANUFACTURING METHOD THEREOF

(75) Inventors: Ji-Hoon Sohn, Anyang (KR); Eun-A Moon, Seoul (KR); Bum-Jin Bae, Seoul (KR); Young-Jae Cho, Seoul (KR); Byung-Gil Ryu, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/277,973

(22) Filed: Oct. 23, 2002

(65) Prior Publication Data
US 2003/0076457 A1   Apr. 24, 2003

(30) Foreign Application Priority Data
Oct. 24, 2001   (KR) ............................ 2001/65684

(51) Int. Cl.
*G02F 1/1335* (2006.01)

(52) U.S. Cl. .................. 349/106; 349/110; 349/111

(58) Field of Classification Search ........... 349/110, 349/106, 111
See application file for complete search history.

(56) References Cited

U.S. PATENT DOCUMENTS

| | | | | |
|---|---|---|---|---|
| 5,495,354 A | * | 2/1996 | Jo | 349/110 |
| 5,757,452 A | * | 5/1998 | Masaki et al. | 349/110 |
| 5,783,338 A | * | 7/1998 | Cho | 430/7 |
| 6,099,993 A | * | 8/2000 | Kim et al. | 430/7 |

* cited by examiner

*Primary Examiner*—Andrew Schechter
*Assistant Examiner*—Thoi V. Duong
(74) *Attorney, Agent, or Firm*—Fleshner & Kim LLP

(57) ABSTRACT

A color filter substrate of an LCD includes: a substrate having a plurality of pixel regions; a first black matrix formed between the pixel regions on the substrate; a second black matrix formed at an upper portion of the first black matrix and separating each pixel region; and a color layer formed at the pixel region. Overflowing of the ink solution caused as the characteristics of the resin black matrix is changed due to the absorption of the solvent contained in the ink solution is prevented, an yield of the ink of the color filter can be improved, and a reliability of process can be obtained.

34 Claims, 10 Drawing Sheets

COLOR FILTER SUBSTRATE FOR LIQUID CRYSTAL DISPLAY AND MANUFACTURING METHOD THEREOF

BACKGROUND OF THE INVENTION

1. Field of the Invention

The present invention relates to a color filter substrate of a liquid crystal display (LCD) device and its manufacturing method and, more particularly, to a color filter substrate and its manufacturing method that is capable of preventing degradation of properties of a black matrix by changing a structure of the black matrix.

2. Description of the Background Art

In general, a black matrix of an LCD, positioned at each boundary of color filter layer representing red, green and blue color, interrupts a light at a region which is not controlled by a pixel electrode, so as to improve an overall contrast of the LCD.

Conventional methods for manufacturing a color filter substrate including the black matrix include a method in which chromium or chromium oxide is plated on the upper surface of a glass substrate and patterned, and a method in which a resin is spread on the upper surface of a glass substrate and patterned.

The method of forming a black matrix by using chromium or chromium oxide is adopted in case that the height of the black matrix is relatively low and a color layer is formed by a pigment dispersion method. Meanwhile, the method of forming a black matrix by using a resin is adopted in case that a black matrix is formed relatively high and a color layer is formed by an ink-jet print method.

As mentioned above, in the conventional arts, the pigment dispersion method and the ink-jet method are usually used to form a color layer positioned between black matrices, and such conventional color filter substrate and its manufacturing method will now be described with reference to the accompanying drawings.

FIGS. 1A through 1E are sectional views showing sequential process of manufacturing a lower plate of a general LCD.

As shown in FIGS. 1A through 1E, the manufacturing process of a lower plate of an LCD includes the steps of: plating a metal at an upper surface of a glass substrate 1 and patterning it by a photolithography process so as to form a gate electrode 2; plating a gate insulation film 3 at an upper surface of the gate electrode 2, plating an amorphous silicon at an upper surface of the gate insulation film and patterning it so as to form an active area 4 at an upper side of the gate electrode 2 so that a thin film transistor is to be formed; forming a source electrode 5 and a drain electrode 6 at a certain upper portion of the gate electrode 2, separated with a certain interval from the central portion of the active area 4; plating a passivation layer 7 at an entire upper surface of the resulting structure and forming a contact hole in the passivation film 7 so as to expose a certain upper portion of the drain electrode 6; plating ITO (Indium Tin Oxide) at an entire upper surface of the resulting structure and patterning it so as to form a pixel electrode 8 which is connected to the exposed drain electrode 6 and positioned at an upper side of a region where the thin film transistor is not positioned.

The process of manufacturing a lower plate of an LCD will now be described in detail with reference to FIGS. 1A through 1E.

Figure 1A:
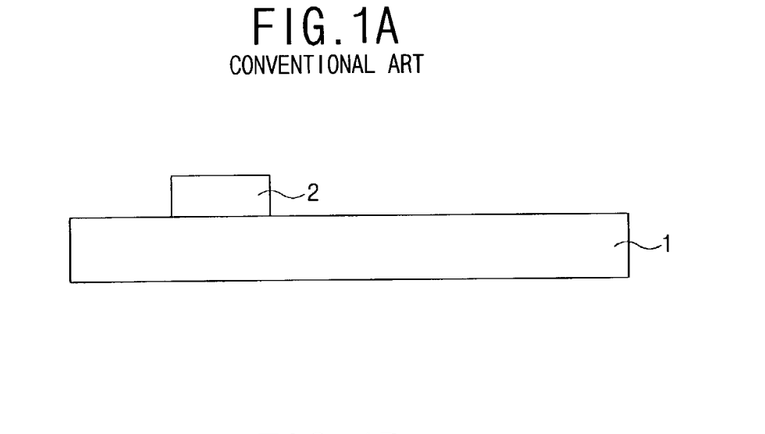
FIGS. 1A through 1E are sectional views showing a process of manufacturing a lower plate of a general LCD.

First, as shown in FIG. 1A, a metal is plated at an upper surface of the glass substrate 1. Next, a photosensitive polymer is spread at an upper surface of the metal, exposed and developed so as to form a pattern exposing a portion of the metal. And then, the exposed metal is etched through an etching process using the photoresist pattern as an etching mask, thereby forming the gate electrode 2 to be positioned at a certain upper portion of the glass substrate 1.

Figure 1B:
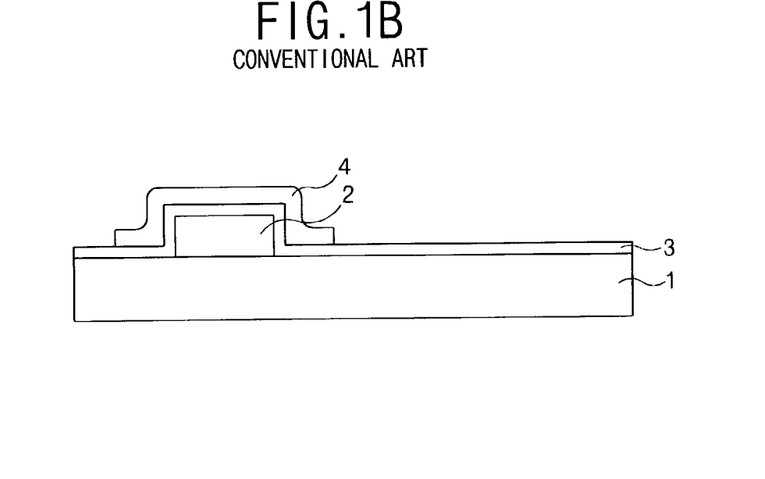

Thereafter, as shown in FIG. 1B, after the gate insulation film 3 is plated at the upper surface of the glass substrate 1, the amorphous silicon is plated on the upper portion of the gate insulation film 3 and patterned through the photolithography process, so as to form the active area 4 at an upper side of the gate electrode 2 where the thin film transistor is to be formed.

Figure 1C:
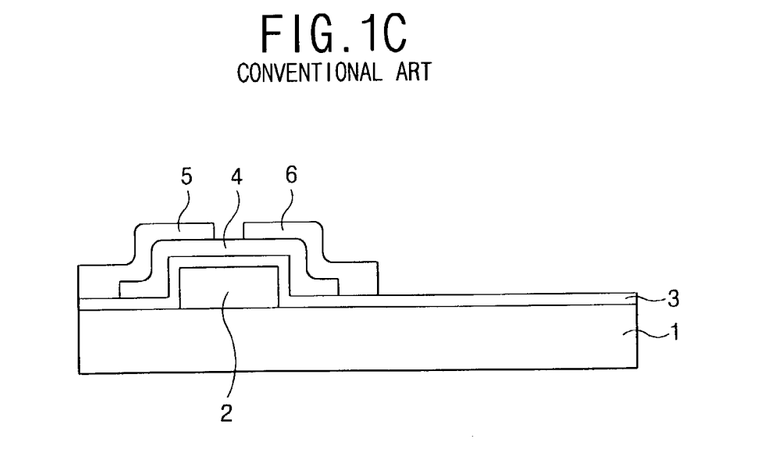

And then, as shown in FIG. 1C, the metal is plated at the upper surface of the resulting structure, patterned through the photolithography process so as to form the source electrode 5 and the drain electrode 6 at both sides of the active area 4, separating them as wide as a channel region formed at the center thereof.

Figure 1D:
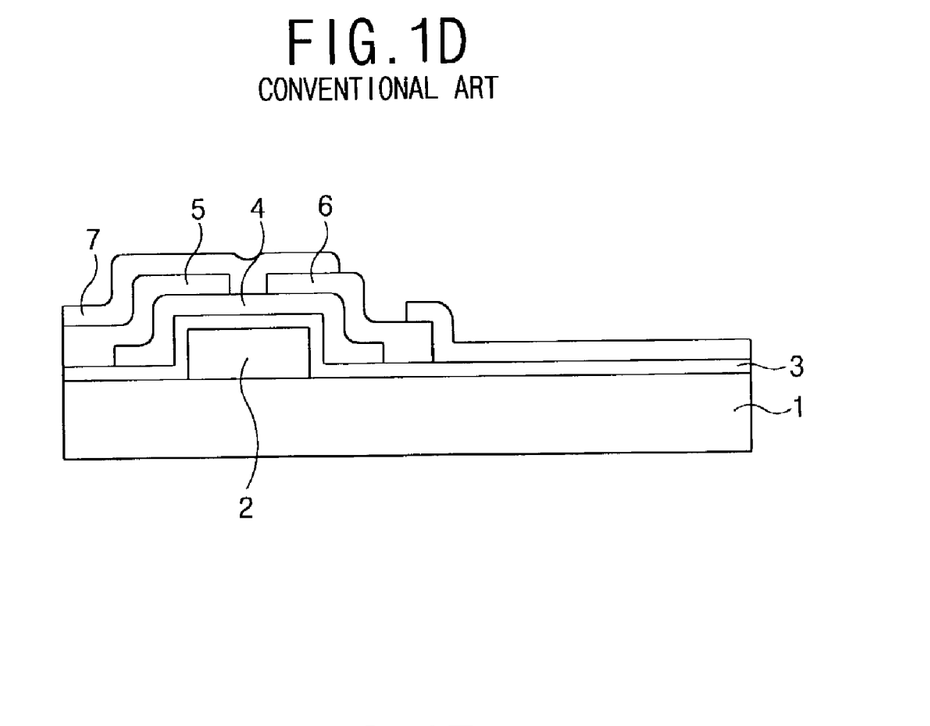

And, as shown in FIG. 1D, after the passivation film 7 is plated at the entire upper surface of the resulting structure, the contact hole is formed in the passivation film 7 through the photolithography process, exposing a certain upper portion of the drain electrode 6.

Figure 1E:
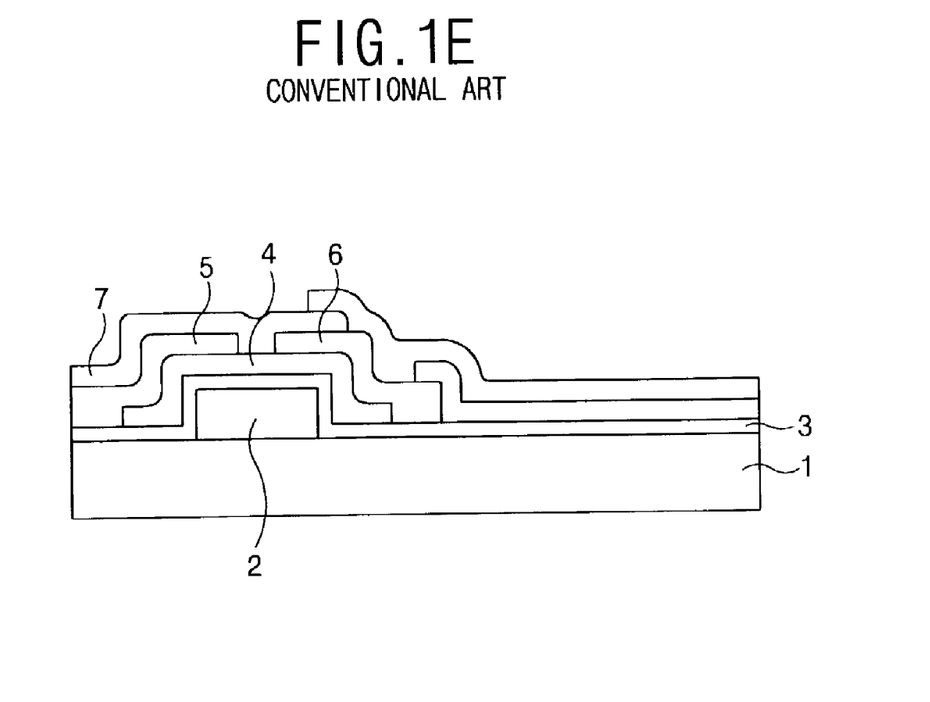

Thereafter, as shown in FIG. 1E, the ITO is plated at the upper surface of the resulting structure and patterned to form the pixel electrode 8 to be connected to the drain electrode 6.

FIGS. 2A through 2D show sectional views of a process of manufacturing an upper plate of an LCD including the conventional color filter substrate.

As shown in FIGS. 2A through 2D, a process of manufacturing an upper plate of an LCD including the conventional color filter substrate includes the steps of: plating a metal or spreading a resin at an upper surface of a glass substrate 21, and patterning the metal or the resin so as to form a black matrix 22 to be formed at a certain upper portion of the glass substrate 21 at a certain distance; forming a color layer 23, a color filter, at an upper portion of the glass substrate 21 exposed between the black matrices 22; forming an over-coating layer at an entire upper surface of the resulting structure to protect the color layer 23; and forming a common electrode 25, a transparent electrode, at an upper surface of the resulting structure.

The conventional method for manufacturing the upper plate of an LCD including the color filter will now be described in detail.

Figure 2A:
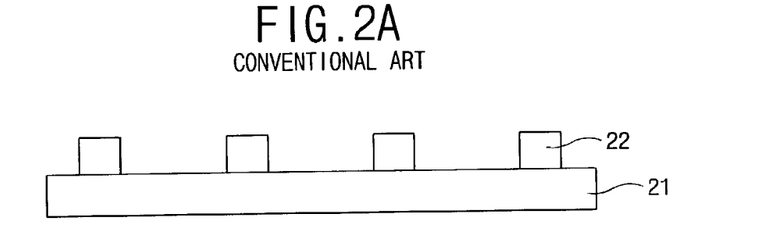
FIGS. 2A through 2D are sectional views showing a process of manufacturing an upper plate of an LCD having a color filter substrate in accordance with a conventional art.

First, as shown in FIG. 2A, a metal such as chromium or chromium oxide is plated or a resin 21 is spread at the upper surface of the glass substrate 21. Next, the metal or the resin is patterned so as to form a black matrix 22 to be positioned at a certain upper portion of the glass substrate 21 at a certain distance.

At this time, the black matrix 22 should have characteristics of excellent adherence and light absorption rate. The black matrix 22 is formed in a grid-typed structure which divides each color layer of the color filter into pixel units on a plane, and each unit black matrix 22 has a single structure that different color layers come in contact with both sides of the unit black matrix 22. In the construction of the lower plate, the grid-typed structure of the black matrix 22 is formed such that it is directed to the upper side of a transistor gate line and an upper side of a data line.

Figure 2B:
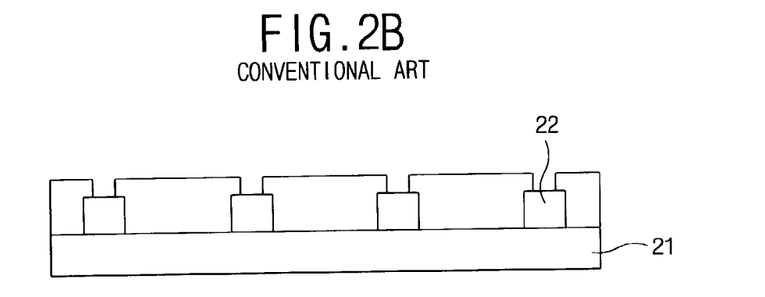

Thereafter, as shown in FIG. 2B, a color layer 23, a color filter, is formed at an upper portion of the glass substrate 21 exposed between the black matrices 22. At this time, the color layers 23 are typically formed in order of red, green and blue color.

The color layer 23 forming methods are roughly divided into a pigment method and a dye method, and, depending on a manufacturing method, it is also divided into a dyeing method, a dispersion method, a spread method, a print method, an ink-jet print method, or the like.

Among them, the pigment dispersion method is widely used in which a photoresist containing a pigment is spread and developed, on which a post baking is performed to form a specific color layer, and then the process is repeatedly performed to sequentially form different color layers.

Figure 2C:
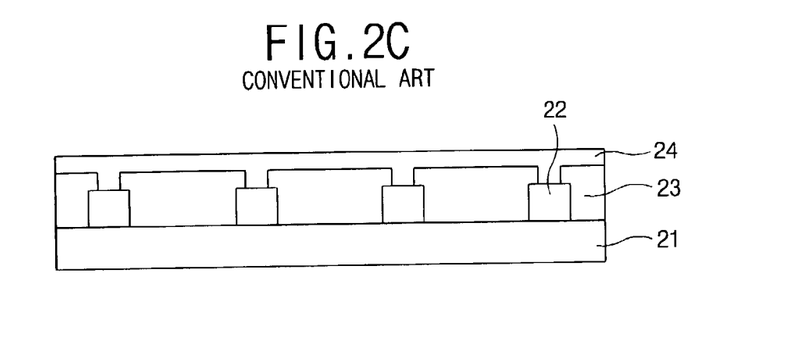

Thereafter, as shown in FIG. 2C, the over-coating layer 24 is formed at the entire upper surface of the resulting structure to protect the color layer 23. At this time, the over-coating layer 24 is formed by plating an organic film containing acryl.

Figure 2D:
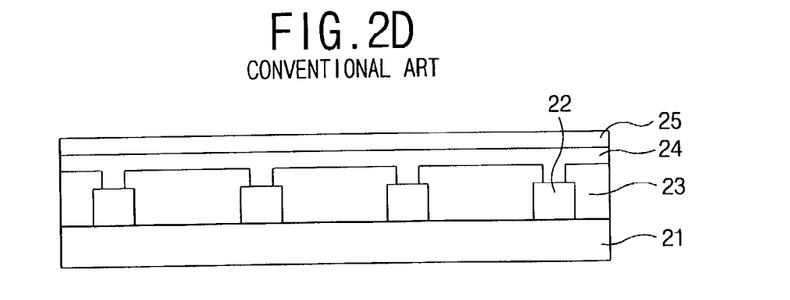

And then, as shown in FIG. 2D, ITO is plated at the upper surface of the resulting structure and patterned through a photolithography process, so as to form a transparent electrode 25 in the direction of the pixel electrode 8 formed at the lower plate.

Figure 3:
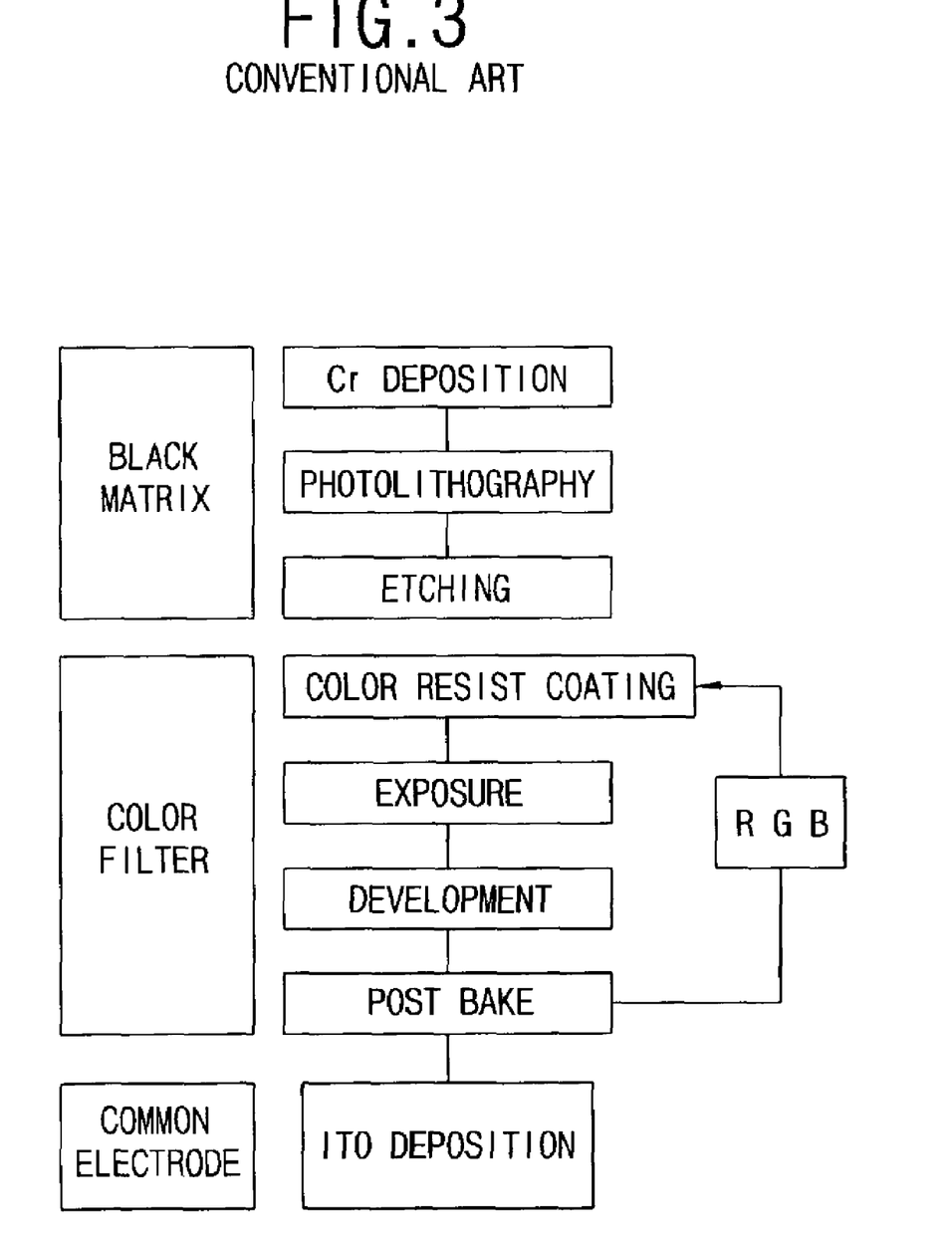
FIG. 3 is a flow chart of a process of manufacturing the color filter substrate adopting a pigment dispersion method in accordance with the conventional art.
Figure 4A:
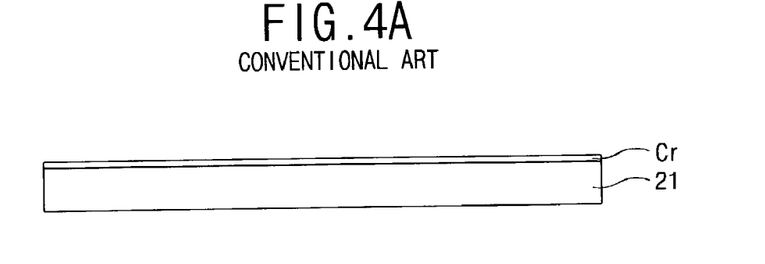
FIGS. 4A through 4D are sectional views showing a process of manufacturing the color filter substrate using the pigment dispersion method.
Figure 4B:
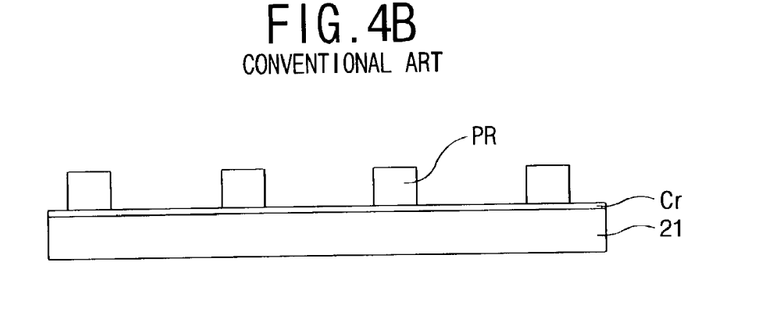
Figure 4C:
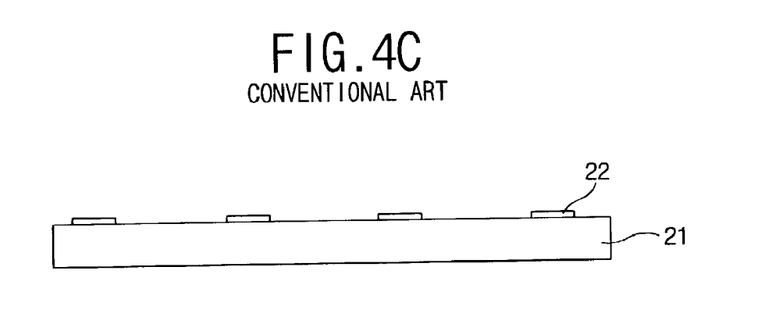
Figure 4D:
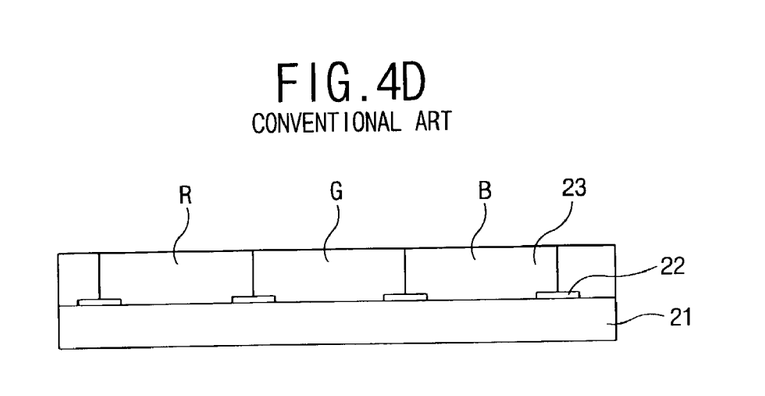

FIG. 3 is a flow chart of the process of manufacturing the color filter substrate adopting the pigment dispersion method.

As shown in FIG. 3, the process of manufacturing the color filter substrate adopting the pigment dispersion method includes a series of steps in which chromium is plated on the glass substrate and patterned through a photolithography process so as to form the black matrix, a photoresist containing a color layer component repeatedly for the red, green and blue through coating, exposing, developing and post baking, is placed to be in contact with the glass substrate between the black matrices, and different color layers are formed mutually being in contact with each other at the central portion of the black matrix.

FIGS. 4A through 4D are sequential sectional views of the process of manufacturing the color filter substrate by using the pigment dispersion method.

As shown in FIGS. 4A through 4D, the process of manufacturing the color filter substrate by using the pigment dispersion method includes the steps of: plating chromium at an upper portion of the glass substrate 21; spreading and developing the photoresist (PR) at an upper portion of the chromium (Cr) and exposing a certain upper portion of the plated chromium at regular intervals; etching chromium through an etching process by making the photoresist (PR) pattern as an etching mask and removing the photoresist (PR) pattern so as to form black matrix 22 on the glass substrate 21; and sequentially forming different (R, G, B) color layers 22 between the black matrices 22 by using the pigment dispersion method.

Though the pigment dispersion method consumes a large amount of a material compared to the spin method, it has an excellent uniformity in the thickness, so that it is most widely used.

However, with the pigment dispersion method, the photoresist should be spread, exposed, developed and post-baked for each of the red, green and blue colors, and thus, the manufacturing process is complicated. In addition, a step of spreading the photoresist by the spin-coating method is necessary, the most of the photoresist spread in the development process should be removed, and a high-priced process with much loss of a material, resulting in an increase in a manufacturing cost of a color filter.

Moreover, as the LCD gets larger in its size, it is not easy to obtain a uniformity of the photoresist spread by the spin-coating method. Thus, it can hardly applied for manufacturing the large-scale color filter.

Unlike the pigment dispersion method, the inkjet print method, a color layer forming method, is such that a relatively thick black matrix is formed by using a resin, an ink solution comprising of a color layer component and an organic binder is pressured between the black matrices, and the ink solution is injected from a nozzle and dried to remove the organic binder, thereby attaching the color layer on the glass substrate.

The ink-jet printer method consumes a less amount of material compared to the other methods, so that a manufacturing cost of the color filter can be reduced.

FIGS. 5A through 5D are sequential sectional views showing the process of fabricating a color filter substrate to form a color layer by the ink-jet print method.

As shown in FIGS. 5A through 5D, the process of fabricating a color filter substrate includes the steps of: spreading a resin at an upper portion of the glass substrate 21 and forming a pattern to form a resin black matrix 22 higher than the chromium black matrix, and injecting an ink solution (R) of a specific color between the resin black matrices 22 by using the ink-jet print method; drying the injected ink solution (R) to form a color layer 23 (R); injecting an ink solution (G) with a different color from the color layer 23 (R) between the resin black matrices 22 positioned at the side of the formed color layer 23 (R); and drying the injected ink solution (G) to form a color layer 23 (G).

However, in the conventional process of manufacturing the color filter substrate to form the color layer by the ink-jet print method, in order to obtain a color layer with a desired thickness, a thicker color layer than the resin black matrix 22 should be printed, and accordingly, the injected ink solution can be spread to a different color layer region before it is dried, causing a degradation of an yield.

In addition, as the solvent contained in the ink solution is infiltrated into the resin black matrix 22, it makes the black matrix to lose its repulsive force to the ink solution, resulting in a problem that it is very difficult to form a desired pattern.

Figure 5A:
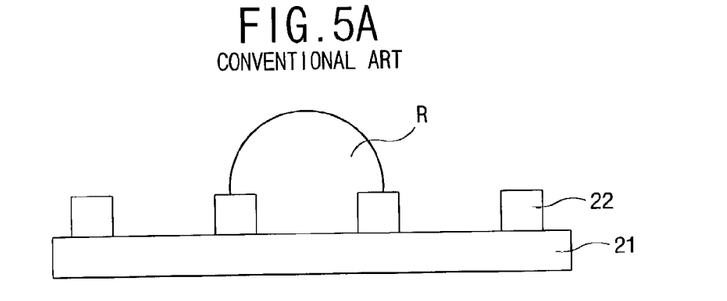
FIGS. 5A through 5D are sectional views showing a process of manufacturing the color filter substrate to form a color layer by an ink-jet print method in accordance with the conventional art.
Figure 5B:
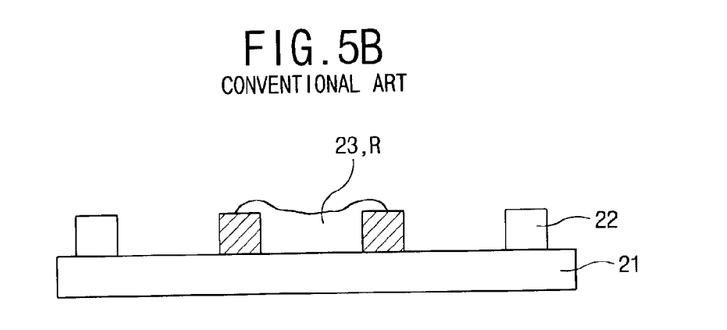

FIG. 5B shows that as the solvent contained in the ink solution is infiltrated into the resin black matrix 22 in the process of forming the color layer 23 (R), the repulsive force of the resin black matrix 22 against the ink solution is lost.

Figure 5C:
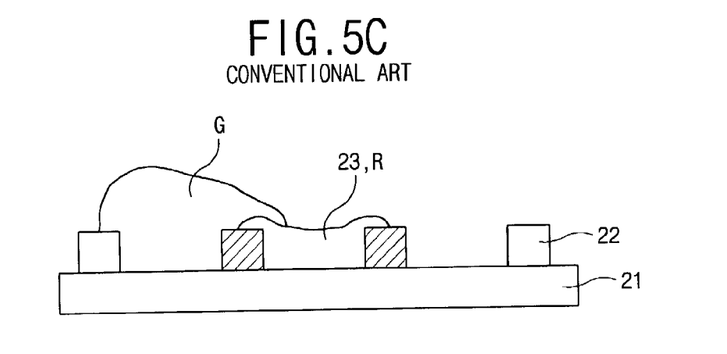
Figure 5D:
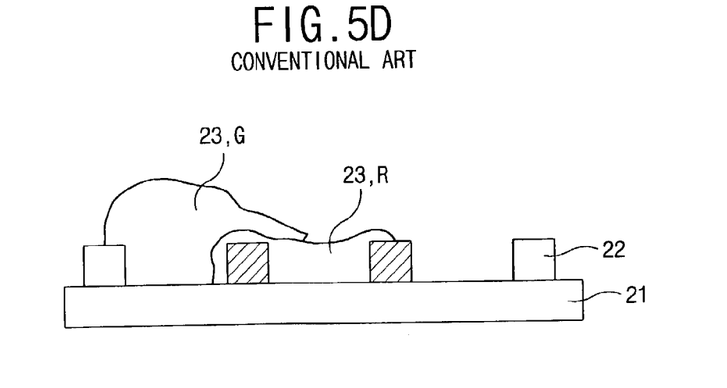

In such a state, as shown in FIGS. 5C and 5D, if a different color ink solution (G) is injected, the injected ink solution (G) passes beyond the repulsive force-lost black matrix 22, and in case of drying the ink solution thereafter, a desired color filter can be hardly obtained due to the mixture of the color layers 23.

Thereafter, through the steps as illustrated in FIGS. 2C and 2C, the overcoating layer 24 and the transparent electrode 25 are formed.

FIGS. 6A through 6D are sectional views of the process of attaching the manufactured upper plate and lower plate.

As shown in FIGS. 6A through 6D, the process of attaching the upper plate and the lower plate includes the steps of: forming an orientation film 31 at an upper portion of the upper plate 30, the color filter, rubbing the oriented film 31 by using a rubbing fabric so that liquid crystal can be oriented at a follow-up step, and plating a sealant 32 at a portion other than a display effective area of the upper plate 30; forming an oriented film 34 at an upper portion of the lower plate 33 and rubbing the oriented film 34 by using the rubbing fabric so that liquid crystal can be oriented, and forming a spacer 35 with a uniform distribution on the oriented film 34; facing the upper plate 30 and the lower plate 33 so that the two oriented films 31 and 34 are facing each other, and firing the sealant 32 so as to attach the upper plate 30 and the lower plate 33; and injecting liquid crystal 36 into the region between the upper plate 30 and the lower plate 30 as attached.

The process of attaching the upper plate and the lower plate will now be described in detail.

Figure 6A:
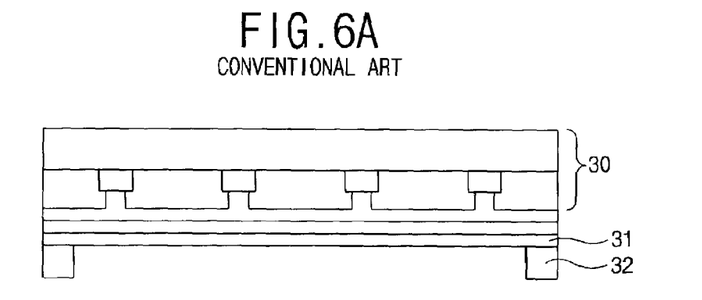
FIGS. 6A through 6D are sectional views showing cohering of an upper plate and a lower plate.

First, as shown in FIG. 6A, the oriented film 31 is formed at an upper portion of the upper plate 30, the color filter, that is, at the upper portion of the transparent electrode 25. At this time, the oriented film 31 is formed in such a manner that an oriented liquid is uniformly applied on a rubber resin plate attached on a roller, printed on the substrate, dried so that the oriented film 31 can be uniformly spread while evaporating the solvent, dried by a firing process and hardened.

And then, the oriented film 31 is rubbed by using the rubbing fabric. Through the process, the oriented film 31 is formed in a certain direction. Thereafter, the sealant 32 is plated at a portion other than the display effective area of the upper plate 30 by using a screen mask method, printed, and heated for 48 minutes at a temperature of 90° C. to evaporate the solvent.

Figure 6B:
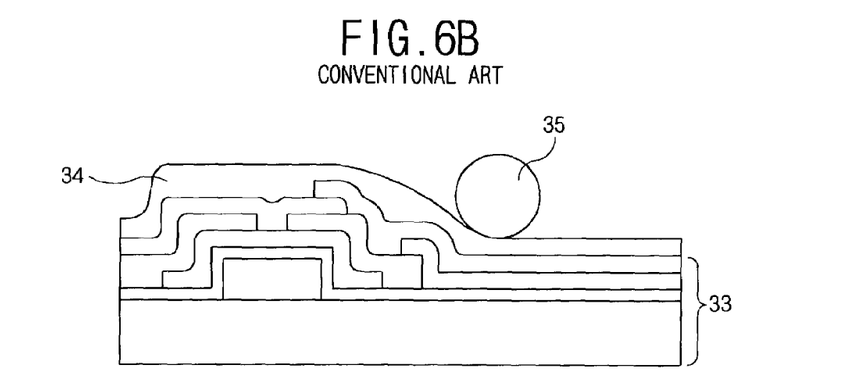

Thereafter, as shown in FIG. 6b, the oriented film 34 is formed at an upper portion of the lower plate 33, and rubbed by using the rubbing fabric, so as to provide a certain direction in which the liquid crystal is oriented, and then, the spacer 35 is scattered on the oriented film with a uniform distribution.

The spacer 35 serves to maintain a space between the upper plate 30 and the lower plate 33. The scattering methods includes a wet scattering method in which the spacer 35 is mixed with the solvent and scattered and the solvent is evaporated, and a dry scattering method in which the spacer 35 and the lower plate 33 are charged in a different form so as to be scattered without a mass. Among them, the dry scattering method is usually used to position the spacer 35.

Figure 6C:
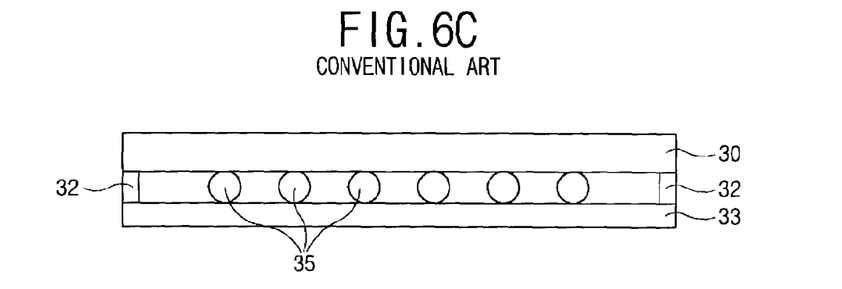

Next, the upper plate 30 and the lower plate 33 are placed in the facing manner so that the two oriented films 31 and 34 can be faced each other, and a plastic working is performed on the sealant 32, so as to cohere the upper plate 30 and the lower plate 33.

In the coherence process, the upper plate 30 and the lower plate 33 at not completely sealed but there is formed a liquid crystal injection hole with a portion thereof exposed.

Figure 6D:
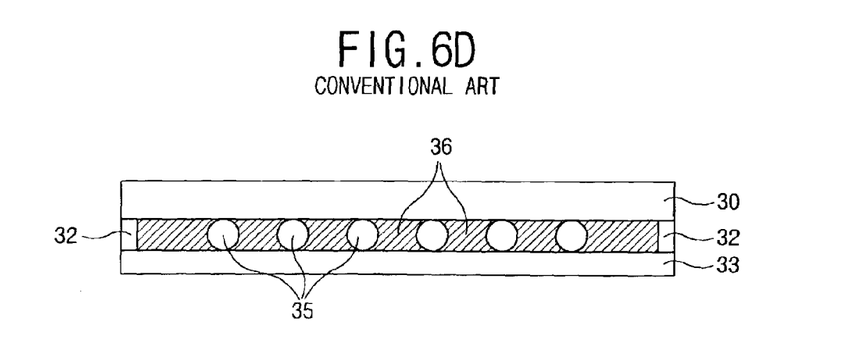

And then, as shown in FIG. 6D, the liquid crystal 36 is injected into the region between the upper plate 30 and the lower plate 33, and the liquid crystal injection hole is sealed to completely separate the liquid crystal from the outside.

Figure 7:
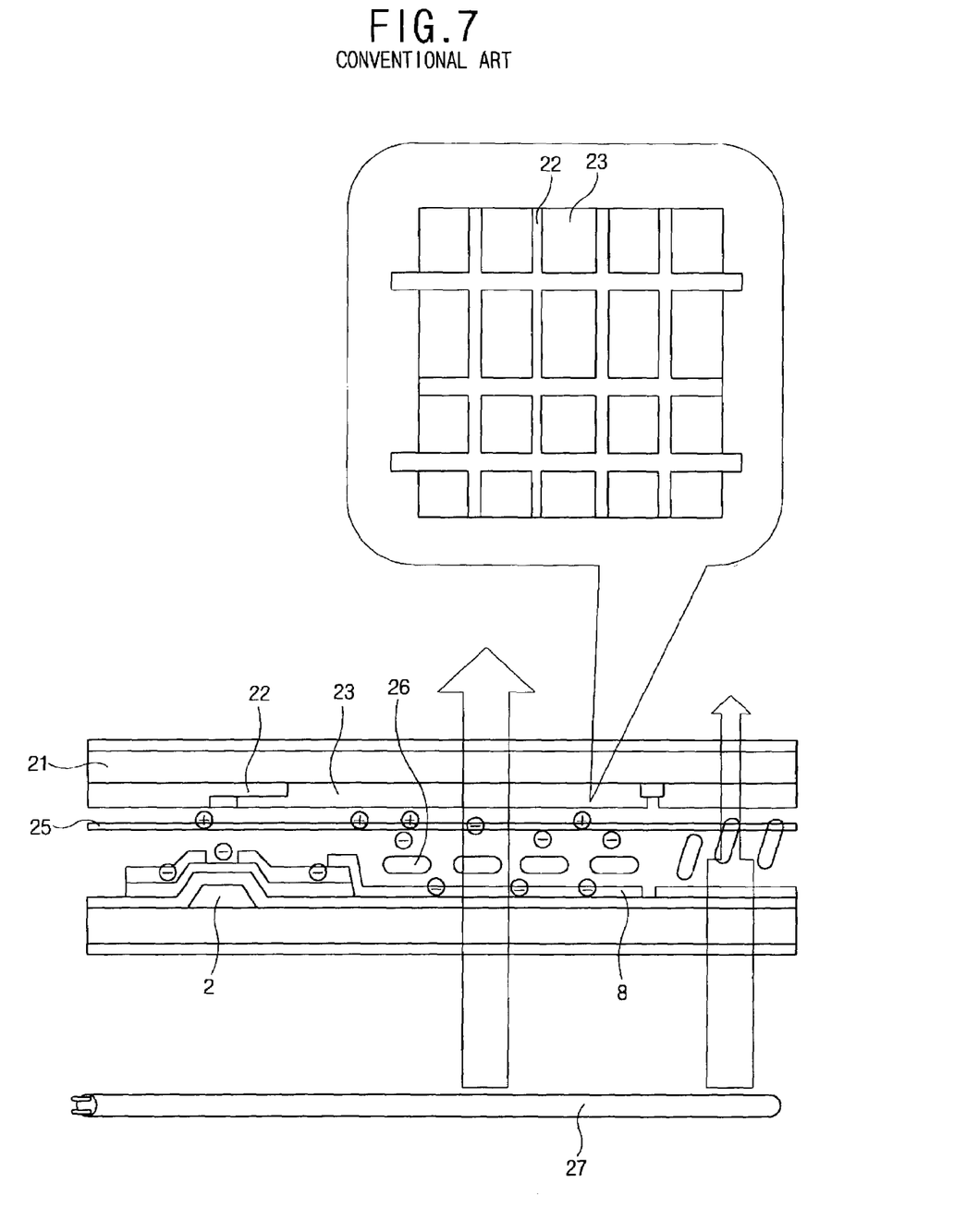
FIG. 7 is an operational illustration view of a general LCD.

FIG. 7 is an operational illustration view of a general LCD.

As shown in FIG. 7, by applying a gate voltage to the gate electrode 2 of the transistor, an operation voltage applied through a data line is applied to the pixel electrode 8 and, at the same time, the direction of the liquid crystal is changed due to a difference voltage between the operation voltage and the transparent electrode 25 of the upper plate, so that a degree of light transmission of the back light 27 is determined for each pixel.

Accordingly, a transmitted light is displayed as a color represented by each color layer 23 and, at this time, light is interrupted at the region between pixels by the black matrix 22, so that a contrast can be improved.

As noted in FIG. 7, the black matrix 22 has a grid structure which discriminates a different and the same color layer by a pixel unit.

As stated above, the pigment dispersion method, that is, the conventional method of manufacturing a color filter substrate of an LCD, has the following problems: First, the manufacturing cost is increased. Second, since the uniformity of the thickness is not obtained, it can't be adopted for a large scale glass substrate, and thus, an LCD with a large scale screen can't be manufactured.

Meanwhile, in case of using the ink-jet print method, in the process of forming the resin black matrix and forming the first color layer between the black matrix, the component of the resin black matrix at the side of the first color layer is changed, and in addition, in the process of forming the second color layer at the region adjacent to the first color layer, the second color layer can be spread toward the upper portion of the first color layer before the first color is dried yet. As a result, the yield is degraded and a reliability of the process is also degraded.

SUMMARY OF THE INVENTION

Therefore, an object of the present invention is to provide a color filter substrate of an LCD and its manufacturing method that are capable of accurately forming a color layer pattern even though a color layer is formed by an ink-jet print method.

To achieve these and other advantages and in accordance with the purpose of the present invention, as embodied and broadly described herein, there is provided a color filter substrate of an LCD including: a substrate having a plurality of pixel regions; a first black matrix formed between the pixel regions on the substrate; a second black matrix formed at an upper portion of the first black matrix and separating each pixel region; and a color layer formed at the pixel region.

To achieve the above objects, there is also provided a method for manufacturing a color filter substrate of an LCD including the steps of: forming a first black matrix defining a pixel region at an upper portion of a substrate; forming a second black matrix for separating the pixel region at an upper portion of the first black matrix; and forming a color layer by plating an ink solution at the pixel region.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

A color filter substrate of an LCD in accordance with the present invention consists of a portion for interrupting a light against a black matrix, and a portion isolatedly formed at a marginal portion of the portion interrupting a light so as to serve as a diaphragm to prevent overflow of a unit color layer.

FIGS. 8A through 8E are sequential sectional views showing a process for manufacturing a color filter substrate of an LCD in accordance with the present invention.

The color filter substrate of an LCD in accordance with the present invention includes: a substrate 81 including a plurality of pixel regions; a first black matrix 82 formed between the pixel regions on the substrate; a second black matrix 83 formed at an upper portion of the first black matrix and isolating each pixel region; and a color layer 84 formed at the pixel region.

A method for manufacturing a color filter substrate of an LCD in accordance with the present invention includes the steps of: forming the first black matrix 82 defining a pixel region at an upper portion of the substrate 81; forming a second black matrix at the upper portion of the first black matrix to separate the pixel regions; and forming a color layer by spreading an ink solution at the pixel region.

The method for manufacturing the color filter substrate of an LCD in accordance with the present invention will now be described in detail.

Figure 8A:
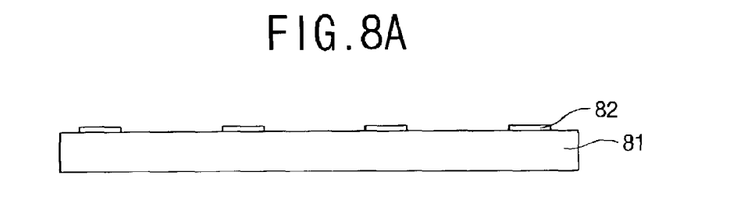
FIGS. 8A through 8E are sequential sectional views showing a process for manufacturing a color filter substrate of an LCD in accordance with the present invention.

First, as shown in FIG. 8A, chromium or chromium oxide is plated at an entire upper surface of the glass substrate 81, and photoresist is spread, exposed and developed at the upper portion of the plated chromium or the chromium oxide, thereby forming a photoresist pattern at the upper portion of the chromium.

Subsequently, chromium or chromium oxide under the photoresist pattern is etched by using an etching mask, so as to form the black matrix 82.

At this time, the first black matrix 82 can be formed in any form, but since most LCDs are fabricated in an active matrix form, the first black matrix 82 is preferably formed in a matrix form.

Figure 8B:
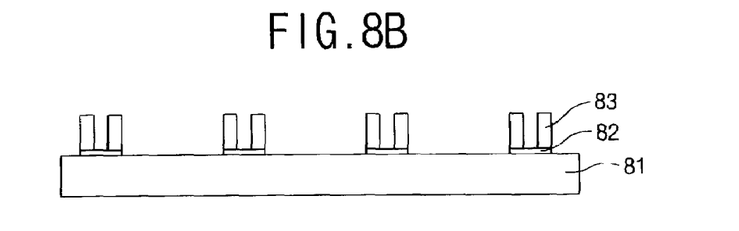

Thereafter, as shown in FIG. 8B, a resin is spread at the entire upper surface of the glass substrate 81 with the first black matrix 82 formed thereon, and patterned through the photolithography process, so as to form the second black matrix 83 at the upper portion of the first black matrix 82. The second black matrix 83 prevents the pigment (i.e., an ink solution, etc.) spread at each pixel from invading other pixels in forming the color layer, as well as interrupts a light.

In this point of view, the second black matrix 83 can be called a diaphragm formed between pixels. The difference in terms shows only a functional difference, not a structural difference. Thus, in the detailed descriptions and claims of the present invention, the second black matrix and the diaphragm are used with the substantially same meaning.

The second black matrix 83 can be formed with any size and any width so long as it can be formed at the upper side of the first black matrix 82. Preferably, the second black matrix 83 is formed with two diaphragms and, as to its whole width, ⅓~⅕ of the first black matrix 82 is exposed.

Figure 8C:
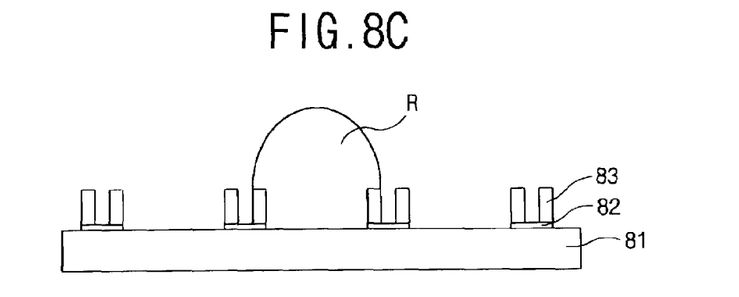

Thereafter, as shown in FIG. 8C, the red ink solution (R) is spread or stacked on the pixel region which is independently covered by the second black matrix 83.

At this time, the red ink solution (R) is spread higher than the second matrix 83. This is because the ink solution (R) is lowered down when it is dried.

Meanwhile, since a repulsive force works between the second black matrix 83 and the ink solution (R), even if the ink solution (R) is spread to be higher than the second black matrix 83, it could not overflow to an adjacent pixel region.

Figure 8D:
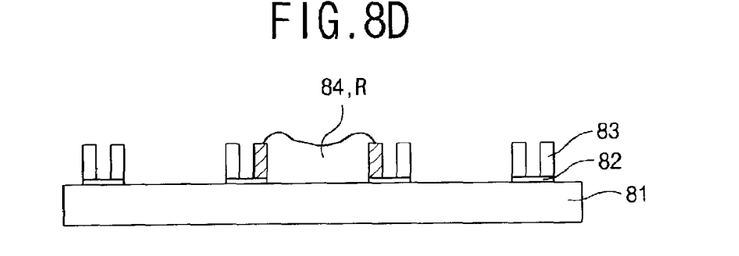

And then, as shown in FIG. 8D, the red ink solution (R) is dried to form a red (R) color layer 84,R.

At this time, the second black matrix 83 made of the resin being in contact with the red color layer 84, R absorbs the solvent contained in the ink solution, and accordingly, it losses the repulsive force against the ink solution. Thus, in order to prevent the loss of repulsive force of the second black matrix 83 due to the solvent absorption, the second black matrix 83 is formed as a double layer.

That is, with the two layers (that is, the diaphragms), when the ink solution is spread at the pixel adjacent, the ink solution is prevented from overflowing to other pixel owing to the repulsive force.

Figure 8E:
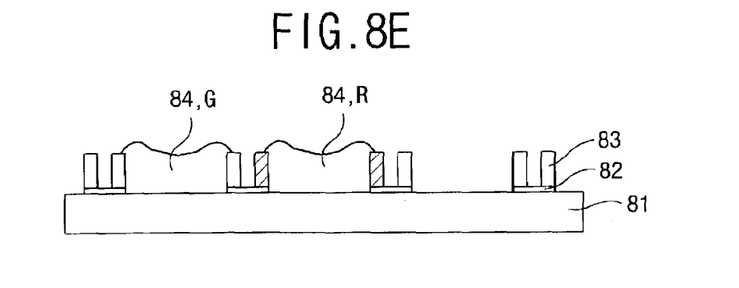

Thereafter, as shown in FIG. 8E, the green (G) ink solution is spread at the pixel region on the exposed glass substrate 81, adjacent to the side of the red color layer (84,R) by using the ink-jet head.

At this time, among the two second black matrices 83, the second black matrix 83 disposed at the side of the pixel region on which the green ink solution (G) is spread does not absorb the solvent when the red color layer (84, R) is formed and since the repulsive force against the ink solution is maintained as it is, the green ink solution (G) would not overflow to a neighboring pixel region.

Figure 9:
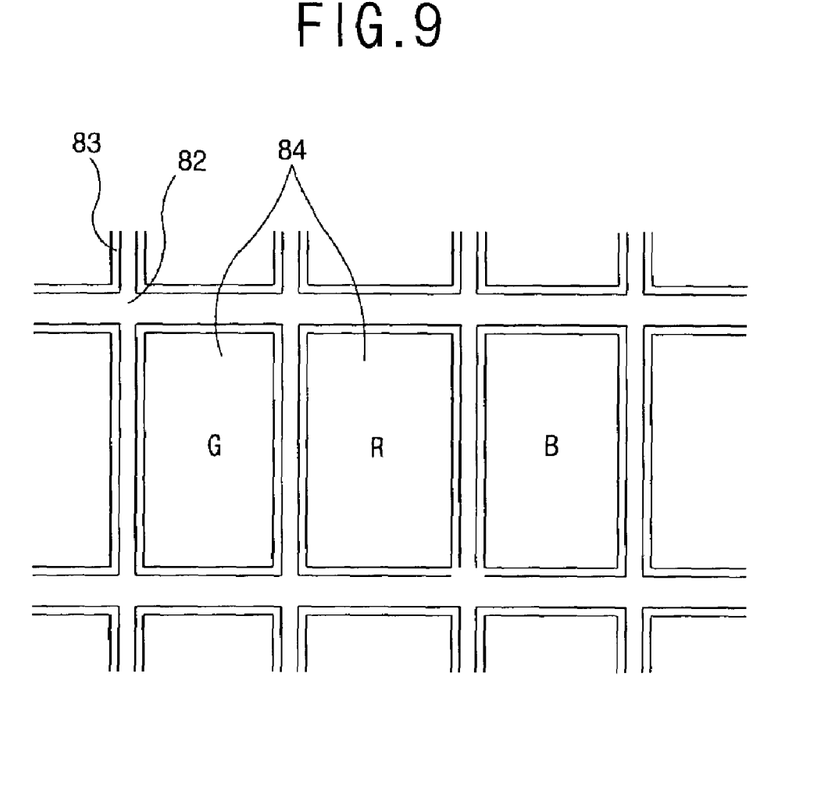
FIG. 9 is a plan view of a substrate with first black matrix and a second black matrix formed thereon.

FIG. 9 is a plan view of a substrate with first black matrix and a second black matrix formed thereon.

As shown in FIG. 9, the pixels border by the first black matrix 82, and the second black matrix 84 is formed around the pixel regions, isolating a corresponding pixel region from a different pixel region.

Figure 10:
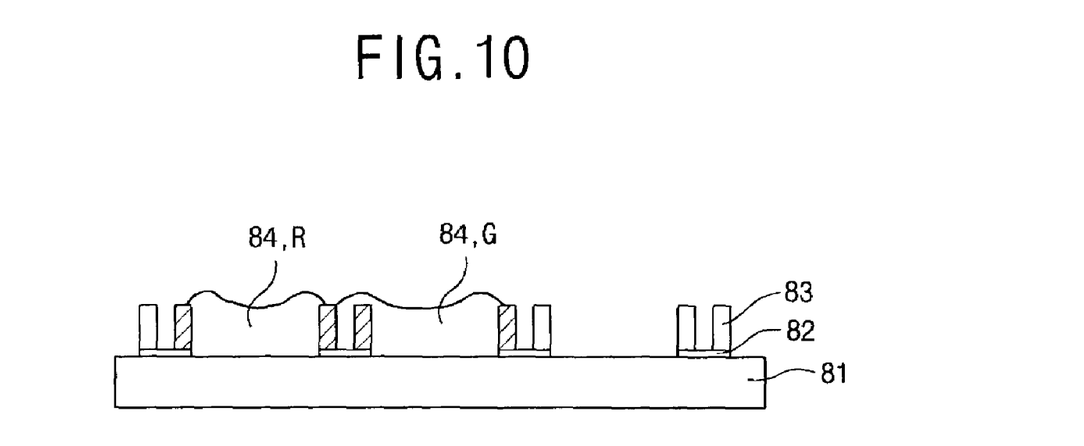
FIG. 10 is a sectional view showing a case that a color layer of an LCD is erroneously formed.

FIG. 10 is a sectional view showing a case that a color layer of an LCD is erroneously formed.

Even if a small amount of green ink solution (G) overflows as shown in FIG. 8E, the green ink solution (G) is positioned in the space between the second black matrices 83 positioned at the side of the red color layer (84, R). Thus, red (R) and green (G) color can be prevented from being mixed.

Thereafter, the green ink solution (G) is dried to form a green color layer (84, G).

Formation of the color layers 84 is not limited to its order, and the three colors can be printed in any order to form the color layer. And, its position can be changed as necessary.

Though not shown in the drawing, a blue color layer is spread on the adjacent pixel region and dried to form a blue color layer.

And then, a protection layer and a transparent electrode are sequentially formed at the upper portion of the color layer 84, thereby manufacturing a color filter substrate.

As so far described, the color filter substrate and its manufacturing method of the present invention have the following advantages.

That is, the black matrix is constructed with a metal block matrix which substantially interrupts a light and the resin black matrix which is formed at an upper marginal portion of the metal black matrix and serves as a diaphragm to prevent the ink solution for forming the color layer from overflowing. Therefore, overflowing of the ink solution caused as the characteristics of the resin black matrix is changed due to the absorption of the solvent contained in the ink solution is prevented, an yield of the ink of the color filter can be improved, and a reliability of process can be obtained.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such metes and bounds are therefore intended to be embraced by the appended claims.

What is claimed is:

1. A color filter substrate of a Liquid Crystal Display comprising:
    a substrate;
    a first black matrix having a grating type formed on the substrate for separating R, G, B sub-pixel regions, wherein the first black matrix is made from metal;
    a second black matrix formed on and contacting the first black matrix for providing an outline of each of the sub-pixel regions, wherein the second black matrix is made from resin and comprises a plurality of sidewalls positioned such that adjacent sidewalls are physically isolated from each other; and
    a color layer formed in at least one sub-pixel region.

2. The substrate of claim 1, wherein the color layer extends to a height from the substrate that is greater than a height of a top surface of the sidewall from the substrate.

3. The substrate of claim 1, wherein the plurality of sidewalls surround the sub-pixel regions.

4. The color filter of claim 3, wherein the first black matrix further defines sub-pixel regions and wherein the plurality of walls are adjacent to the sub-pixel regions.

5. A method for manufacturing a color filter substrate of a Liquid Crystal Display comprising:
    forming a first black matrix at an upper portion of a substrate;
    forming a second black matrix on the first black matrix to form a plurality of sub-pixel regions, wherein each sub-pixel is separated from at least one adjacent sub-pixel by a first wall and a second wall and a gap exists between the first wall and the second wall; and
    forming a color layer in at least one sub-pixel region after the second black matrix is formed.

6. The method of claim 5, wherein the first wall and the second wall are not in contact.

7. The method of claim 5, wherein the gap has a width of at least 20% of a width of the first black matrix.

8. The method of claim 5, wherein the second black matrix is formed such that the first black matrix is exposed over a prescribed region between inner edges of the first and second wall.

9. The method of claim 5, wherein the color layer is an ink solution disposed in the at least one sub-pixel region to so as to contact the first wall, and so that a height of the ink solution from the substrate is greater than a height of a top surface of the first wall from the substrate.

10. The method of claim 5, wherein the color layer is a first ink solution that contacts the first wall, and does not contact the second wall.

11. The method of claim 10, wherein the first ink solution comprises a solvent, and wherein the solvent is not communicated to the second wall.

12. The method of claim 10, further comprising providing a second ink solution in a sub-pixel region adjacent to the at least one sub-pixel region, wherein the second ink solution contacts the second wall, and does not contact the first wall.

13. The method of claim 12, wherein the gap is devoid of the first ink solution and the second ink solution.

14. A color filter substrate of a Liquid Crystal Display comprising:
    a substrate;
    a first black matrix having a grating type formed on the substrate for separating R, G, B sub-pixel regions, wherein the first black matrix is made from metal;
    a second black matrix formed on and in contact with the first black matrix for providing an outline of each sub-pixel region, wherein the second black matrix is made from resin, and is formed such that a subpixel region is separated from at least one adjacent sub-pixel region by dual sidewalls that are physically isolated from one another; and
    a color layer formed in a pixel region.

15. The substrate of claim 14, wherein the dual sidewalls are in a spaced relation.

16. The substrate of claim 14, wherein the space between the dual sidewalls is equal to or greater than 20% of a width of the first black matrix grating.

17. The substrate of claim 14, further comprising a prescribed region of the first black matrix between regions where the dual sidewalls of the second black matrix are respectively in contact with the first black matrix, wherein the second black matrix is not over said prescribed region.

18. A color filter, comprising:
    a substrate;
    a first black matrix array on the substrate that defines pixel regions, wherein the first black matrix array comprises a plurality of first strips and a plurality of second strips crossing the first strips;
    a second black matrix array on the first black matrix array, wherein the second black matrix array comprises a plurality of walls adjacent to the pixel regions and positioned on the first and second strips of the first black matrix such that adjacent walls are physically isolated from each other; and
    a color layer in at least one pixel region.

19. The color filter of claim 18, wherein the second black matrix partially covers the first black matrix.

20. The color filter of claim 18, wherein a height of the color layer in at least one pixel exceeds a height of a wall adjacent to the pixel.

21. The color filter of claim 18, wherein the color layer comprises an ink solution that contacts an adjacent wall and does not contact non-adjacent walls.

22. The color filter of claim 21, wherein the ink solution comprises a solvent, and wherein the solvent is not communicated to non-adjacent walls.

23. The color filter of claim 18, wherein the color layer does not extend to areas between adjacent walls.

24. The color filter of claim 18, wherein the plurality of walls surround the pixel regions.

25. A liquid crystal display comprising the color filter of claim 18.

26. A method of forming a color filter, comprising:
    forming a first black matrix array on a substrate that defines pixel regions, wherein the first black matrix array comprises a plurality of first strips and a plurality of second strips crossing the first strips;
    forming a second black matrix array on the first black matrix array, wherein the second black matrix array comprises a plurality of walls adjacent to the pixel regions, and wherein the walls are formed on the first and second strips of the first black matrix such that a gap exists between adjacent walls; and
    forming a color layer in at least one pixel region after the second black matrix is formed.

27. The method of claim 26, wherein the second black matrix is formed such that adjacent walls are physically isolated from each other.

28. The method of claim 26, wherein the second black matrix is formed such that the second black matrix partially covers the first black matrix.

29. The method claim 26, wherein the color layer is formed by placing an ink solution in the at least one pixel region such that it contacts an adjacent wall and does not contact non-adjacent walls.

30. The method of claim 29, wherein the ink solution comprises a solvent, and wherein the solvent is not communicated to non-adjacent walls.

31. The method of claim 26, wherein the color layer is formed such that it does not extend to areas between adjacent walls.

32. The method of claim 26, wherein the first black matrix is formed so as to further define sub-pixel regions and wherein the plurality of walls of the second black matrix are formed so as to be adjacent to the sub-pixel regions.

33. The method of claim 26, wherein the plurality of walls of the second black matrix are formed so as to surround the pixel regions.

34. The method of claim 26, further comprising attaching the color filter to a lower plate to form a liquid crystal display.

* * * * *